INVENTOR.
A. S. VOLPIN
BY Lester B. Clarke
ATTORNEY.

Dec. 30, 1947.　　　　A. S. VOLPIN　　　　2,433,638
AUTOMATIC LUBRICATED VALVE
Filed Sept. 2, 1944　　　　6 Sheets-Sheet 4

INVENTOR.
A. S. VOLPIN
BY Lester B Clarke
ATTORNEY.

Dec. 30, 1947.  A. S. VOLPIN  2,433,638
AUTOMATIC LUBRICATED VALVE
Filed Sept. 2, 1944  6 Sheets-Sheet 5

INVENTOR.
A. S. VOLPIN.
BY Lester B. Clark
ATTORNEY.

Dec. 30, 1947. A. S. VOLPIN 2,433,638
AUTOMATIC LUBRICATED VALVE
Filed Sept. 2, 1944 6 Sheets-Sheet 6

INVENTOR.
A. S. VOLPIN
BY
Lester B. Clarke,
ATTORNEY.

Patented Dec. 30, 1947

2,433,638

UNITED STATES PATENT OFFICE 2,433,638

AUTOMATIC LUBRICATED VALVE

Alexander S. Volpin, Houston, Tex.

Application September 2, 1944, Serial No. 552,429

12 Claims. (Cl. 251—51)

The invention relates to a seat structure and arrangement for the lubrication of valves and is particularly adapted for application to a gate or plug type of valve whereby a minimum of sealing or lubricating material is utilized due to the fact that the lubricant is confined to a closed reservoir in said seat and not released in the valve chamber where it may be contaminated by line fluid, nor will it in turn contaminate the line fluid.

In valves where the valve chamber is utilized as a lubricant or sealing material reservoir, failure to hold high pressures are often traceable to the fact that the line fluid, instead of forcing the sealing material ahead of it to form the seal, will cut or channel through this sealing material and a leak results. Another disadvantage is that a large proportion of the sealing material adheres to the walls of the valve chamber and is not utilizable for lubrication or sealing purposes. Still another disadvantage is that line pressure drives sealing material into the flow passage of the sliding gate while the valve is closed whereupon, when the valve is moved to the open position, this accumulated sealing material is slugged into the downstream line resulting in passage of vital sealing material into the flow line which is not only a waste and loss, but adversely affects meters, contaminated line fluid, and makes frequent lubricant replenishing necessary.

It is desirable in order to feed the sealing or lubricating material into the low pressure side of the valve, to maintain a seal, that a pressure be applied to the lubricant or sealing material in a reservoir in such a manner that the line pressure applied thereto cannot channel through the lubricant or sealing material and bypass the sealing material to leak through the valve.

The present invention, therefore, contemplates one or more line pressure actuated reservoirs which may be disposed in a combination seal and sealing plate which is insertable into the valve housing and which will engage the valve member to effect a seal when the valve member is in closed position.

It is, therefore, one of the objects of the invention to provide a high pressure sliding type of gate valve having a body wherein the storage of lubricant material is confined to a seating plate.

Another object of the invention is to provide a combination seat and sealing plate for valves wherein the line pressure will automatically feed the sealing material to the sealing surfaces of the downstream side to maintain a seal while avoiding channeling of the line pressure through the sealing material.

Another object of the invention is to provide a seat and sealing plate for gate and plug valves whereby the sealing material is automatically moved to sealing position by line pressure while maintaining the sealing material in an uncontaminated condition.

Another object of the invention is to provide a lubricated valve whereby the lubricating material is confined in a seating plate.

Another object of the invention is to provide a combination seat and sealing plate whereby a seal is automatically maintained with the valve housing on the one hand and with the valve closure member on the other hand.

Another object of the invention is to feed a lubricant material through the seat plate so as to provide a seal completely around the valve passage.

Another object of the invention is to provide a plug valve assembly wherein the seating and line pressure actuated lubricating mechanism may be made in one member insertable in the valve housing and which will offer economies in manufacture and ease of rebuilding a worn valve.

Other and further objects of the invention will be readily apparent when the following description is considered in connection with the accompanying drawings wherein.

The present invention is in the nature of an improvement of the structure of my prior Patent 2,317,657, issued April 27, 1943.

Figure 1:
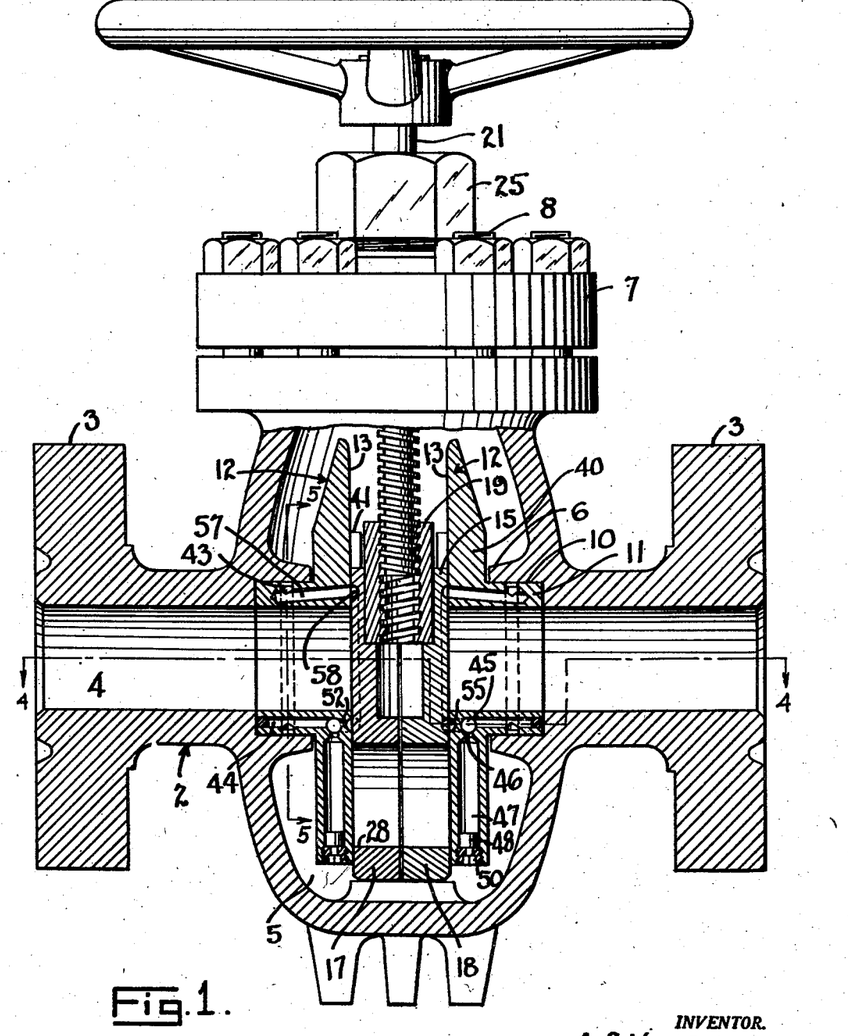
Fig. 1 is a vertical sectional view through a gate valve in closed position and illustrating the arrangement of the parts.

In Fig. 1 a valve housing 2 has been shown which is made up of an integral forging or casting having the flanges 3 at each end and the passage 4 extending therethrough. This passage is interrupted by a valve chamber 5 which is formed in the housing and has the annular extending ribs 6 defining the entrance to the passage 4 at each side of the chamber.

Figure 2:
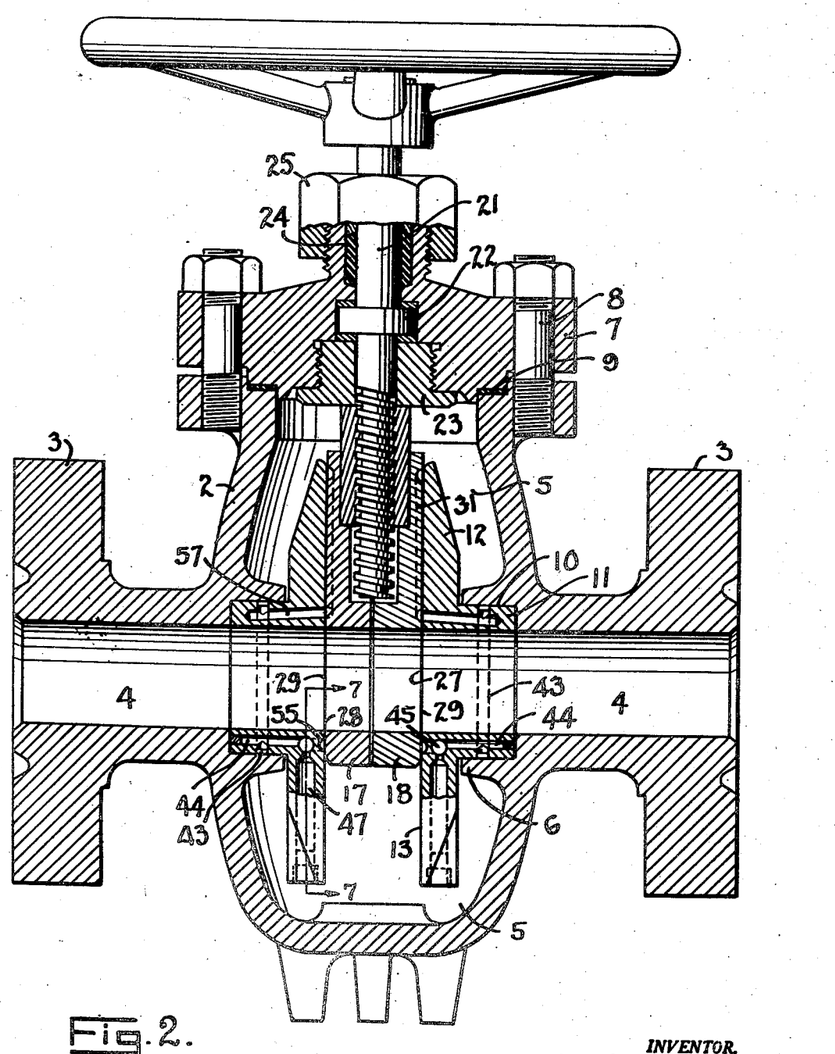
Fig. 2 is a vertical sectional view of the valve of Fig. 1 with the valve member in open position.
Figure 3:
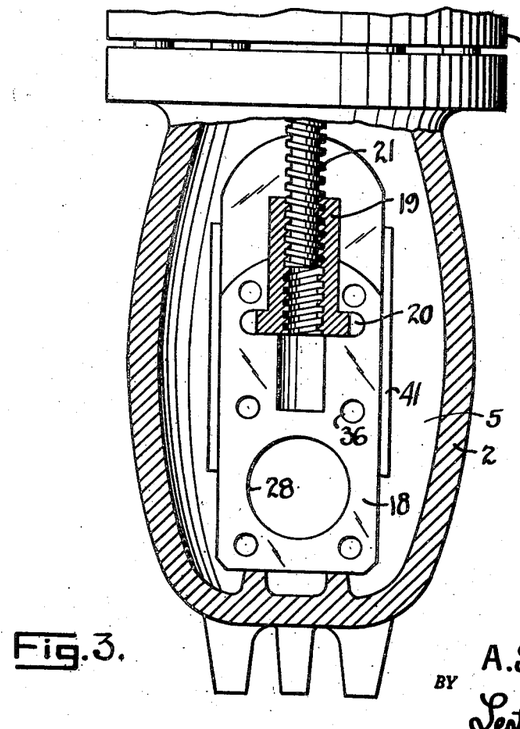
Fig. 3 is an end elevation of the valve housing broken away on the center line to illustrate the construction of the valve member.

The chamber 5 is open at the top as best seen in Fig. 2 and is arranged to be closed by a cap or bonnet 7 affixed to the body by the bolts and nuts 8. A gasket 9 may form a seal between the cap and the body.

The passage 4 is enlarged in the annular rib 6 to provide the recess 10 which is arranged to receive the annular extension 11 of the combination seat and sealing plate 12.

One of these plates 12 is shown as disposed at each side of the valve chamber 5 so as to provide a seating face 13 for the valve member 15.

The invention of Figs. 1 to 8 inclusive illustrates the invention as applied to a gate valve of the sliding type where the gate member moves from the closed position of Fig. 1 to the open position of Fig. 2 and is made up of the two gate members 17 and 18 which are complementary and arranged to receive the threaded bushing 19 disposed in a recess 20 so as to effect movement of the gate member. This threaded bushing 19 receives the stem 21 which is shown in elevation in Fig. 2. This stem has a flange 22 thereon to fit into a recess in the bonnet or cap 7 so that the stem will rotate and effect the raising or lowering of the valve member. A gland 23 holds the flange 22 in position and the packing 24 held in place by the nut 25 forms a packing around the stem. It seems obvious that rotation of the stem will serve to manipulate the valve member.

The members 17 and 18 are preferably identical and have a seating and sealing face 27 which is arranged to engage the face 13 of the plates 12. The member 17 has the opening or passage 28 therethrough which is to move into alignment with the passage 4 when the gate is in open position at which time, of course, no seal is necessary around the opening. When, however, the gate member is moved to the closed position of Fig. 1 it is desirable to form a seal around the passage 4 as defined by the opening 29 in the face of each of the seating plates 12. To accomplish this the upper portion of the member 17 is provided with an inverted U-shaped groove 31 best seen in Fig. 6. This groove is shown as extending around the top and down along each side of the opening 29 so as to provide an area for sealing or lubricating material which will encompass a substantial part of the opening 29. The inwardly turned extensions 32 serve as connections to receive sealing material from the plates 12 when the valve member is in closed position as seen in Fig. 1.

Figure 4:
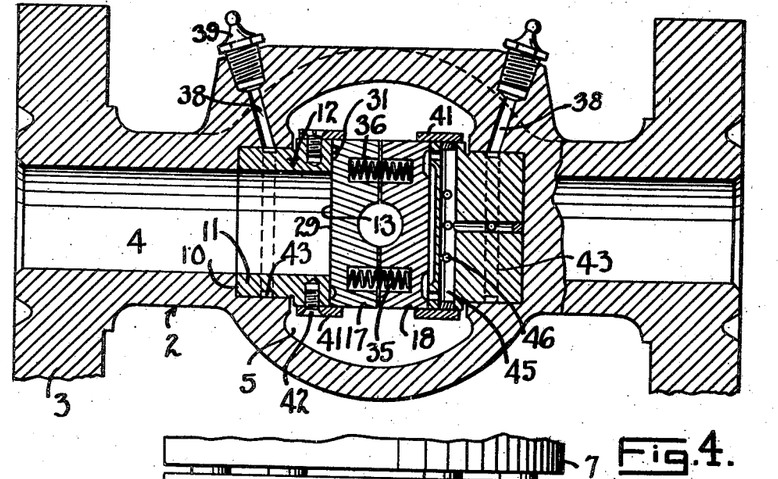
Fig. 4 is a section taken on the line 4—4 of Fig. 1 showing a horizontal view of the parts.
Figures 5, 6:
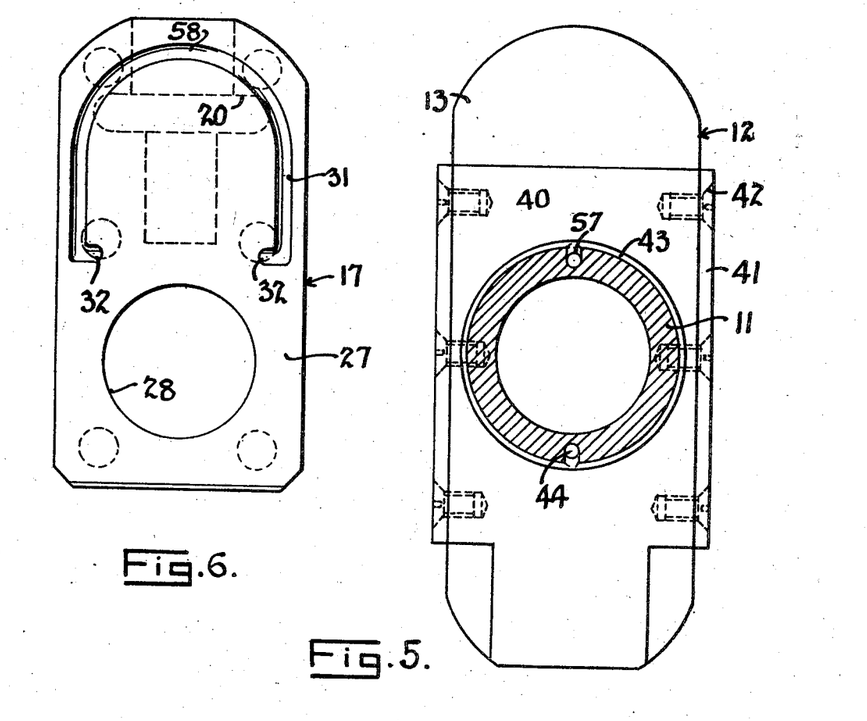
Fig. 5 is a section taken on the line 5—5 of Fig. 1 illustrating the manner of sealing the seat plate with the housing.
Fig. 6 is an elevation of the sealing face of one of the valve members.

Fig. 4 shows the compression springs 35 as being fitted into the recesses 36 in the members 17 and 18 so as to normally urge them apart. Fig. 6 shows six such openings to receive six springs in order to uniformly hold the gate members in sealing position.

Figure 7:
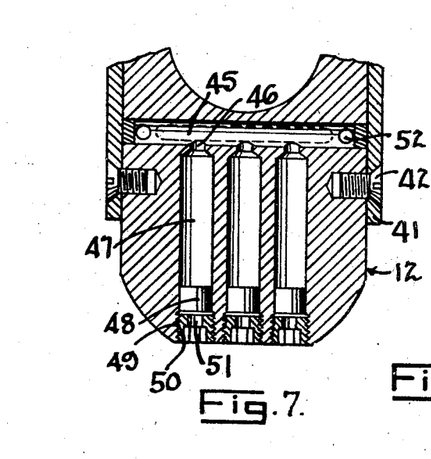
Fig. 7 is a sectional view taken on the line 7—7 of Fig. 2 illustrating the internal construction and arrangement of the reservoirs in the seat plate.
Figure 8:
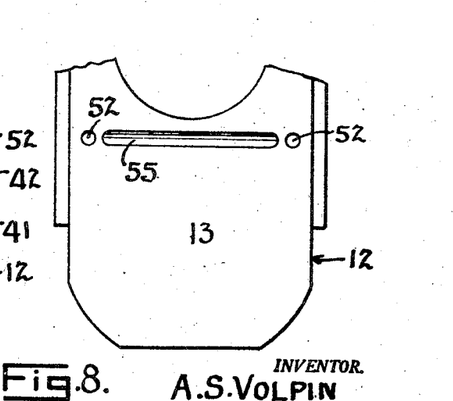
Fig. 8 illustrates the front face elevation of one of the seat plates.

One of the novel essential features of the invention is the provision of the combination sealing and seating plate 12. This plate is made up of a body portion 40 having the extension 11 thereon which is in the form of a cylindrical sleeve arranged to engage in the recess 10.

Fig. 5 shows a rear view with the extension 11 in section and illustrates how the guide plates 41 may be affixed with the screws 42 so as to embrace the gate members 17 and 18 as seen in Fig. 4.

Each of the seating plates 12 is of particular construction in order to adapt it to form a seal with both the housing and the gate member. As seen in Fig. 4 the extension 11 is provided with an annular groove 43 so that sealing material forced into such groove will provide a seal with the recess 10 in the housing. A supply passage 38 closed by a fitting 39 is seen in Fig. 4 whereby a supply of lubricant or sealing material may be forced into the valve and the groove 43.

As seen in Fig. 5 the groove 43 connects with the conduit 44 on the bottom of the extension so that sealing material forced into the groove 43 will flow also into the conduit 44. This conduit 44 extends inwardly of the valve and joins the manifold passage 45. This manifold passage extends across the sealing plate 12 as seen in Fig. 7.

Lubricant forced into the groove 43 and passage 44 will move into the manifold passage 45 and thence through the openings 46 into the several reservoirs 47 which are arranged to receive lubricant material. A plug or barrier 48 is free to move in each cylinder or reservoir and will be forced downwardly by the incoming sealing material until it engages the stop bushing 49 threaded at 50 into the base of the plate 12. This bushing has an opening 51 opening into the valve chamber 5 and when the chambers or reservoirs are filled with sealing material the piston 48 will be in the position of Fig. 7. Fig. 7 shows three such reservoirs in each of the sealing plates, but, of course, more or less, larger or smaller reservoirs may be provided.

When the reservoirs have been filled, of course, no more material can be forced in through the fittings 45 because the pistons 48 will be at their lower limit of movement.

It seems clear that line pressure occurring in the passage 4 when the valve is closed will bear against the high pressure side of the valve gate or member 15 compressing the springs 35 slightly so that there will undoubtedly be a leakage of the line pressure into the valve chamber 5. This pressure will, of course, exert itself through the opening 51 against the lower portion or bottom of the barrier or pistons 48 tending to move such pistons upwardly and displace the sealing material from the reservoirs.

In order to automatically take advantage of this existing force the openings 52 lead to the front face 13 of the plate 12 at a point which is laterally of the vertical edge of the valve passage 28 in the valve member and in such position as to be connected to the legs 32 of the distribution groove 31 on the gate member 17. Lubricant material will thus fill the groove 31 to form a seal around the upper portion and the sides of the port 29. At this time it is desirable to have a complete seal all the way around the port 29 and a horizontal distribution groove 55 is thus shown in the exposed face 13 of the seating plate and the extensions 32 are of sufficient length to conduct the sealing material from the openings 52 into the distribution groove 55. This groove 55 in combination with the inverted U-shaped distribution groove 31 will form a complete enclosure of the port 29.

To insure that there will be a supply of lubricant in the distribution groove when the valve is in closed position an additional passage 57 is shown in the plate. This opening leads to the crest 58 of the groove 31 when the valve is in closed position as seen in Fig. 1 and will, of course, permit the direct injection of sealing material through the fitting 39 and inlet groove 57 to the sealing faces of the gate and seat.

In operation the valve reservoir will be charged with sealing material through the fitting 39 until no more material can be easily forced into position and the operator will then be advised that the pistons or barriers 48 have all been forced to the bottom of their respective reservoirs and that the valve is ready for installation or use. When the line pressure is applied to the valve such pressure will be available in the chamber 5 through the openings 51 and tend to force the barriers 48 upwardly. Three separate and independent reservoirs are provided so as to give a desired volume of sealing material which will require but infrequent replenishment. In event the lubricant is fed from one cylinder the escape of line pressure through that cylinder is prevented as the barrier 48 moves against the upper portion or top of its reservoir. The automatic feeding of the sealing material continues until all of the reservoirs have been discharged. A complete seal around the ports 29 can thus be maintained automatically due to the application of line pressure to the supply of lubricant. The arrangement disclosed prevents the channeling of the line pressure through the body of lubricant on the one hand and results in a substantial saving in the amount of lubricant used on the other hand.

Another advantage of this arrangement is that it prevents contamination of the sealing or lubricant material because the lubricant is confined to the reservoirs and is not admitted generally to the valve chambers. The valve chamber is entirely devoid of lubricant which reduces substantially the amount of lubricant necessary to charge the valve.

The sealing system for each side of the valve is entirely independent of the other so that the valve may be placed in operation with either side as the high or the low pressure side as desired.

The size of the reservoirs and the pistons can be varied so as to combine the line pressure applied to the lubricant if desired.

The plates are of sufficient length that they protect the sealing surfaces of the gate at all times and the absence of lubricant in the valve housing prevents movement of lubricant into the gate member openings when the valve is in closed position.

Figure 10:
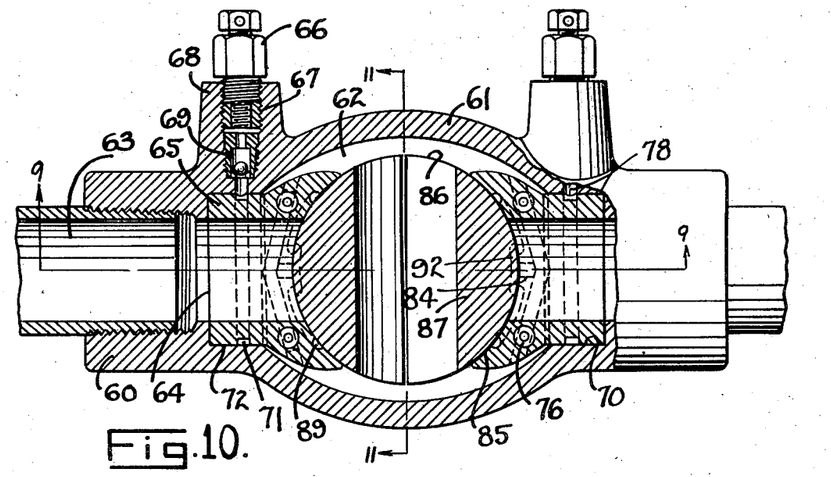
Fig. 10 is a transverse section of the plug valve of Fig. 9.

Fig. 10 shows the invention as applied to a plug valve 60 which is made up of a housing 61 having the chamber 62 therein which is intersected by the flow passage 63. The ports 64 of such passage are each arranged to receive a combination distribution and sealing member 65 which is a modification of the plate 12 of the previous figures. In order to introduce lubricant from the exterior of the housing to the member 65 a fitting 66 is threaded at 67 into a boss 68 formed on the side of the housing and has a check valve 69 therein to control the flow of the lubricant. The member 65 is seen independently in Fig. 13 as having the annular extension 70 provided with a groove 71 which is arranged to receive lubricant from the fitting 66. In this manner a seal is formed with the recess 72 at the port 64.

Figures 11, 13:
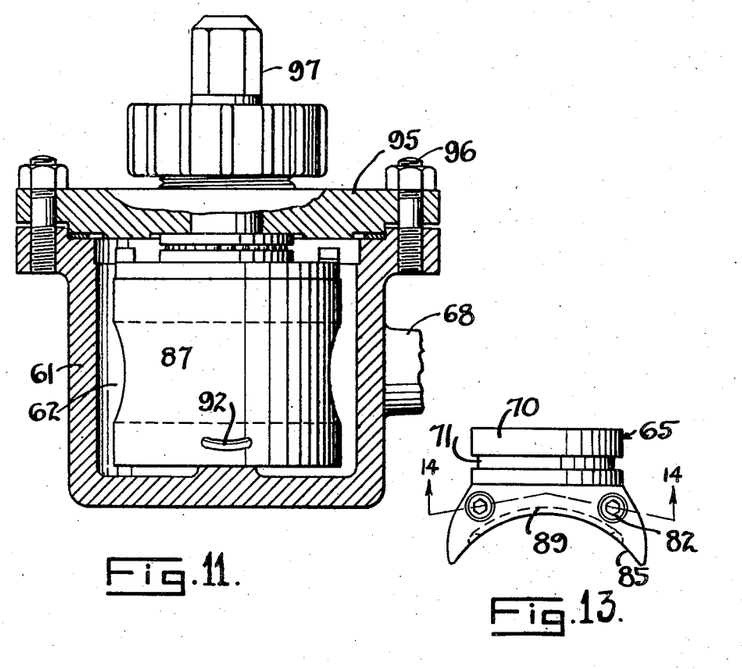
Fig. 11 is a section taken on the line 11—11 of Fig. 10.
Fig. 13 is a top plan view looking down on the combination sealing and lubricant distribution member.

The member 65 is formed quite similar to the plate 12 of the previous figures in that the body 75 thereof is provided with the reservoirs 76 at each side and the passage 77 for alignment with the flow passage 63.

Figure 14:
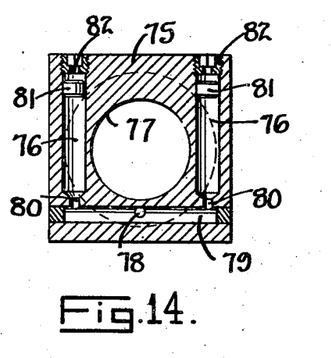
Fig. 14 is a section taken on the line 14—14 of Fig. 13.

An opening 78 is arranged to connect the distribution groove 71 with the reservoirs 76 by means of the passage 79 and the conduits 80 so that when lubricant is applied from the fitting 66 it will move into the groove 71 through the opening 78 and passage 79 into the reservoirs 76 where it will force the barriers 81 upwardly in the reservoirs to the position shown in Fig. 14.

Figure 9:
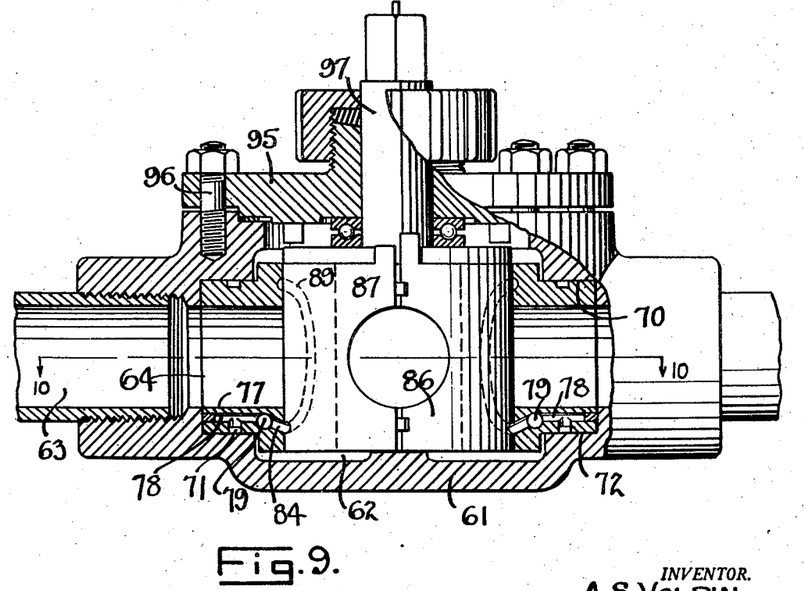
Fig. 9 is a vertical sectional view through a rotatable plug valve construction to which the invention has been applied.

The top of the reservoirs 76 are furnished with the ported plugs 82 therein so that line pressure accumulating in the plug valve chamber 62 will act against the upper surface of the barriers 81, cause them to move down and to force the lubricant out through the distribution grooves. This flow will occur through an opening 84 which may be said to be an extension of the opening 78 as best seen in Fig. 9. This opening 84 leads to the forward face 85 of the combination seat and sealing member 65. This face 85 as seen in Fig. 13 is curved to the same arc as the periphery 86 as is the plug member 87 so that the surfaces 86 and 85 will be in close contact with each other to provide a seal when the closure member 87 is in the position of Fig. 10.

In order to form a sealed area about the port when the closure member 87 is in the position of Fig. 10, a distribution groove 89 has been formed in the face 85 so as to substantially circle the passage or port 77 in such member. It will be noted from Fig. 12 that the ends 90 of this groove 89 do not quite come together, but are spaced a short distance on each side of the inlet passage 84. In this manner when the face of the plug member is against the face 85 of the seat member there will be no connection between the distribution groove 89 and the source of lubricant in the reservoirs which is connected to the passage 84.

In order, however, to permit the distribution of lubricant the plug member 87 as seen in Fig. 11 is provided with a short groove 92 which is of a length to span the distance between the ends 90 of the distribution groove 89 when the valve or plug member is in full closed position.

Figure 12:
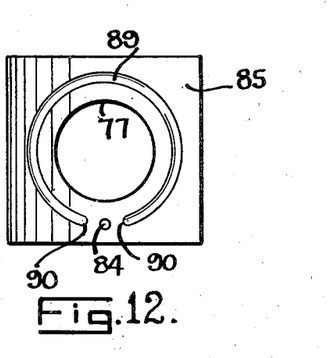
Fig. 12 is a front elevation of the seating and sealing face of the lubricant distribution member.

In other words, in the closed position, when the face of Fig. 12 is fitted against the plug of Fig. 11 the grooves 89 and 92 will form a complete circle about the port 77 and will be supplied with lubricant from the opening 84.

The foregoing arrangement is of particular advantage because the source of lubricant is not connected to the distribution groove except when the plug or closure is in full closed position so that there will be no waste of lubricant or sealing material at any time and a full sealing arrangement is provided for the ports.

The present valve is of particular advantage because it is simple and economical in its construction due to the arrangement of the cap 95 affixed to the body 61 by the bolts 96 and arranged to support the spindle 97 by which the plug member 87 is caused to rotate. It seems obvious that when this cap or bonnet 95 is removed that the plug will also be removed and then the two seat members 65 can be readily removed or replaced as the case may be.

Broadly the invention contemplates a valve having a closure member wherein all of the sealing and distribution material is stored in a combination seating and sealing plate or member.

What is claimed is:

1. A lubricated gate valve including a housing, a gate seat member seated in said housing, interfitting portions on said member and in said housing, a peripheral groove for sealing material between said portions, a gate, means to slide the gate to open or closed position on said member, and means to provide a sealing area between said seat member and gate, a reservoir to store sealing material in said seat member, distribution passages leading from said reservoir to the said second means and to the groove between said portions, and means to introduce sealing material directly through said housing to said seating area and thence to said reservoir.

2. A gate valve having a housing provided with a flow passage, a gate seat at the flow passage, said seat including a plate, a reservoir for sealing material therein, an extension on said plate fitting into the housing flow passage, a conduit passage from said reservoir to and about the periphery of said extension, a movable barrier in the reservoir exposed to line pressure on one side so as to automatically maintain the sealing material uncontaminated about said extension.

3. A gate valve having a housing provided with a flow passage, a gate in said housing, a gate seat at the flow passage, said seat including a plate having a seating face for said gate, a reservoir for sealing material therein, an extension on said plate fitting into the housing flow passage, a conduit passage from said reservoir to and about the periphery of said extension, a movable barrier in the reservoir exposed to line pressure on one side so as to automatically maintain the sealing material about said extension, and additional means to conduct sealing material from said reservoir to said seating face.

4. A valve including a housing, a chamber therein, a closure member in said chamber, flow passages in said housing and member to be aligned, a seat plate at the chamber end of each of the housing passages, each of said plates including a body, an extension thereon disposed in the housing flow passage, a peripheral groove about said extension, means to introduce sealing material through said housing directly to said groove, a face on said plate to engage said closure member, means in the plate to receive and store a supply of sealing or lubricant material from said groove, and means to conduct such material to the said face.

5. A valve construction including a housing, upstream and downstream flow passages through said housing, a chamber in said housing, a closure member in said chamber, a removable seating and sealing face plate disposed at the chamber end of each the upstream and downstream passage, means forming a distribution groove about each passage when the member is in closed position, means comprising a reservoir formed in each of said plates to receive and store a sealing material, and a barrier in said reservoir movable in response to upstream line pressure to distribute such sealing material to the downstream groove.

6. A gate valve including a housing, a gate seat therein, a flow passage in the housing, an extension on said seat to fit into the flow passage of the housing, an annular groove between the periphery of said extension and the wall of said flow passage, means in said housing to inject sealing material directly to said groove, a gate, a groove arrangement between said gate and seat providing a complete circuit about said flow passage when the gate is in closed position, a connection for conveying sealing material to said circuit from said annular groove, and means responsive to line pressure to force sealing material to both said groove and circuit to maintain a seal.

7. A gate valve including a housing having opposed upstream and downstream flow ports, a reciprocable gate in said housing, an independent lubrication system for each port, including a reservoir carried by said housing, means to inject sealing material into one system independent of the other, a movable barrier in each of said reservoirs, each of said systems including a groove arrangement consisting of a complete circuit surrounding a flow port when the valve is in closed position, each said circuit being connected to its said reservoir, and means responsive to line pressure leaking into the housing to act upon said movable barrier of the downstream system and urge sealing material into the groove arrangement.

8. A valve seat member comprising a body, a valve seat surface on one side of said body, an extension projecting from the other side, a groove about said extension intermediate the ends thereof, a flow port through said body and extension, a reservoir in said body to receive and store sealing material, conduit means for conveying sealing material from said reservoir to said groove and to the valve seat surface.

9. A valve of the reciprocating gate type including a housing, a two part sliding gate member therein, a seat on the housing at each the upstream and downstream side of the gate and with which the downstream side of said gate is in sliding wiping engagement at all times, a port to be closed by said gate, a groove about said port at each side of said gate when the gate is closed, independently operable means in said housing to inject sealing material therethrough directly into said groove on either side of said gate when the gate is in closed position.

10. A gate valve including a housing, a seat plate therein, means to support said plate in the housing, a sealing material reservoir in said plate to receive and store sealing material, a barrier therein movable in response to line pressure to move sealing material to maintain a seal between the plate and housing, and means operable to introduce additional sealing material through said housing directly to said seal and reservoir.

11. A lubricating gate valve comprising a housing, a gate, a gate seat against which said gate is always engaged, means to move said gate to open or closed position, means to provide sealing material for the area between said gate and seat including a reservoir to receive and store sealing material in said gate seat, a distribution passage from said reservoir to said area, and additional means to replenish sealing material through said housing directly into said gate seat reservoir and distribution passages without contact with the line fluid so as to avoid contamination by line fluid.

12. A lubricated valve having a body, a body cavity, upstream and downstream flow ports intercepting said cavity, a seat member and a valve having sealing faces at each port, and means to maintain a close mechanical and lubricant seal between the valve and seat member around the downstream port and between said seat and body under conditions of pressure distortion comprising, an extension on each seat member fitting into said body at each flow port to rigidly support said member, a passage to introduce sealing material between the extension and said flow port passage, resilient means to urge said valve to the downstream seat under all operating positions, a reservoir to store sealing lubricant, a piston therein movable in response to line pressure, and a connection from said reservoir to conduct sealing lubricant from said reservoir to said means.

ALEXANDER S. VOLPIN.

REFERENCES CITED

The following references are of record in the file of this patent:

UNITED STATES PATENTS

| Number | Name | Date |
|---|---|---|
| 2,317,657 | Volpin | Apr. 27, 1943 |
| 2,269,887 | Sharp | Jan. 13, 1942 |
| 2,006,715 | McCausland | July 2, 1935 |